United States Patent Office 3,463,213
Patented Aug. 26, 1969

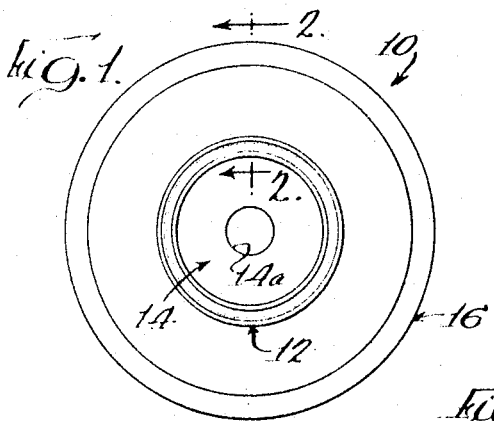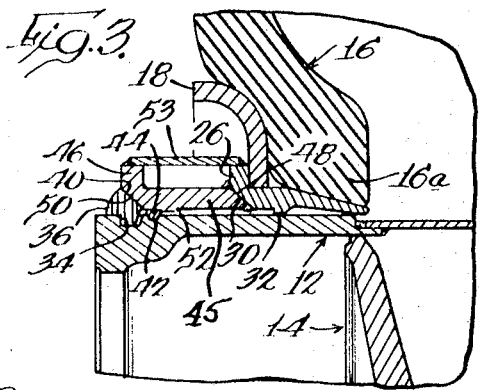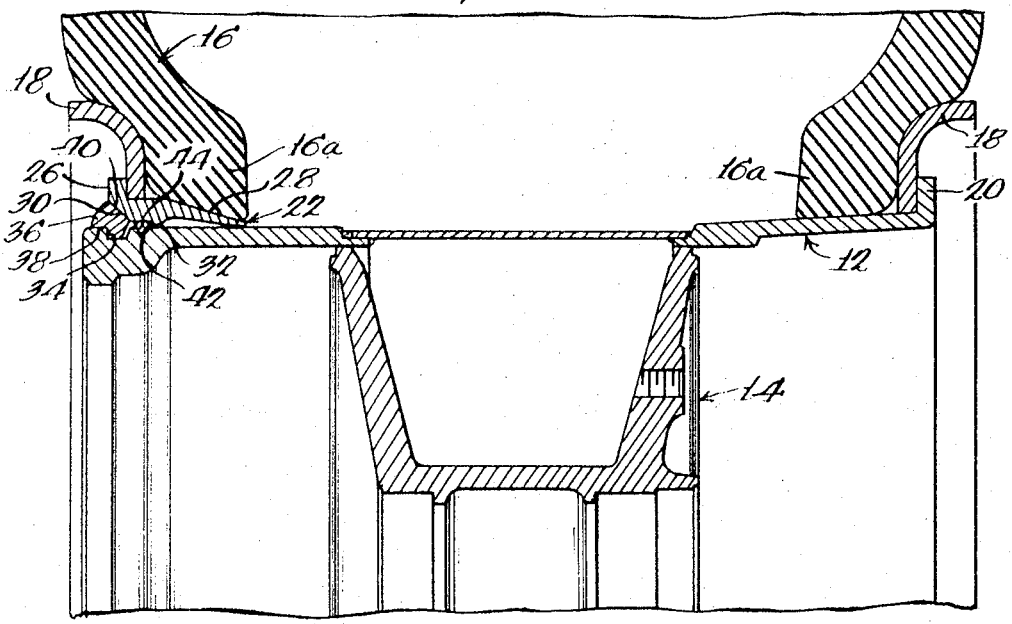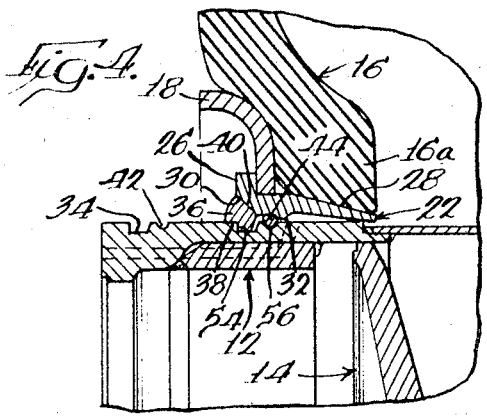

---

3,463,213
DUAL WIDTH TUBELESS TIRE RIM
Ronald A. Wade, Chicago, Ill., assignor to International Harvester Company, Chicago, Ill., a corporation of Delaware
Filed Oct. 20, 1966, Ser. No. 588,194
Int. Cl. B60c 5/16
U.S. Cl. 152—409                         1 Claim

ABSTRACT OF THE DISCLOSURE

An adapter for use with a rim having a lock ring groove which permits the mounting of a tire thereon which is narrower than that the rim normally accepts, the adapter having an annular member with a beveled surface for engagement with a lock ring retained in said groove, an annular lip on said member spaced from the beveled surface a distance equal to the difference in the width of the tires, the lip being engageable with a bead seat flange to retain the narrow tire, and a tapered free end on said member for supporting the tire bead.

---

This invention relates to an improvement in wheel rims for pneumatic vehicle tires and more particularly to an improvement in a tire rim which permits more than one size of tire to be mounted on the rim.

Heavy duty equipment which is supported by pneumatic tires, such as trucks or other construction vehicles, may be frequently subjected to use in an off-the-road environment which may have different characteristics. In addition, the same equipment may be subjected to highway conditions for transport of the vehicle from one working site to another or the like. It is well known that wide tires give better vehicle support in extremely muddy or marshy field conditions whereas narrower tires are better for highway use in that they produce less rolling resistance and reduce the amount of heat build up, thereby promoting the life of the tire.

Heretofore it has been common to adapt heavy vehicles for use in such different conditions by changing the pneumatic tire which supports the vehicle. Sometimes it is necessary to completely disassemble a drive axle to replace the wheel rim and hub to accommodate a different size tire. Many such wheel assemblies include several mechanical components such as gears, bearings, spacers, and seals which must be handled during the interchange of the wheel rim assembly and therefore are subject to damage or malfunction due to improper reassembly.

This invention is directed, in brief, to the provision of a tire rim assembly which may be adapted to receive different tire widths for use under different operating conditions without the necessity of separating the rim from its supporting hub or the rim and hub assembly from its supporting axle.

It is therefore a primary object of this invention to provide a new and improved wheel rim assembly.

It is another object of this invention to provide an improved wheel rim assembly which may be adapted to receive tires of different widths for mounting thereon.

A further object of this invention is to provide a novel bead seat band adapter for use on tire rims to adapt the rim for receiving tires of a width different from the width the rim was originally intended to receive.

Other objects, features and advantages of the present invention will be apparent from the following description of the preferred embodiments illustrated in the accompanying drawings, in which:

FIGURE 1 is a side elevational view of a wheel assembly including a pneumatic tire mounted on a rim;

FIGURE 2 is a fragmentary sectional view taken generally along the lines 2—2 of FIGURE 1;

FIGURE 3 is a fragmentary enlarged section view similar to FIGURE 2 showing the rim adapter of this invention; and FIGURE 4 is a view similar to FIGURE 3 showing a modified form of the invention for adapting a tire rim for receiving the pneumatic tires of widths different from which the rim was intended to receive.

Referring now to the drawings, the wheel assembly 10 includes a generally circular cylindrical rim base 12 which is secured by suitable means, such as welding, to a hub 14. The hub 14 is provided with a central through opening 14a to permit the wheel assembly to be telescoped over the axle of a heavy duty vehicle such as a truck or the like. A pneumatic tire 16, preferably of the tubeless type, is supported by the wheel assembly with the tire beads 16a adjacent the bead seat flanges 18. One bead seat flange 18 abuts an upstanding annular lip 20 formed at one side of the rim base 12 with the other bead seat flange supported on a removable bead seat band 22 at the other side of the rim base.

The bead seat band 22 has an annular lip 26 similar to lip 20 on the rim, the two lips cooperating to hold the bead seat flanges against lateral displacement responsive to the outward urging of the bead portion 16a of the vehicle tire. The bead seat band is further provided with a tapered free end 28 which supports the bottom of the bead seat portion of the tire and a beveled surface 30 under the annular lip portion 26. In addition, the underside of the bead band has an annular rib surface 32 which abuts against the outer periphery of the rim base and holds the remainder of the bead seat band slightly spaced relative thereto.

For holding the bead seat band in position against lateral displacement relative to the rim base, a lock ring groove 34 is formed circumferentially about the rim base 12 adjacent the one edge thereof and a lock ring 36 is positioned in the groove. The lock ring 36 has a generally right angular shoulder 38 which mates with the complementary surfaces of the groove and rim, and a beveled face 40 which generally mates with beveled face 30 of the bead seat band. Thus, when the lock ring occupies groove 34 as shown in FIGURE 1 and the beveled faces 30 and 40 of the bead seat band and lock ring abut each other, the band is held against movement laterally outwardly relative to the rim base in opposition to the pressure exerted by the inflated pneumatic tire and, in particular, the bead seat portion 16a thereof. In addition, the rim base is provided with a circumferentially extending O-ring groove 42 which is spaced laterally inwardly from the lock ring groove. An O-ring 44 is positioned in the groove and abuts the outside of rib 32 on the underside of the bead seat band to provide a positive seal against the escape of any air under pressure from the interior of the tire 16.

Means are provided for adapting the wheel rim to receive tires of different widths. In the preferred embodiment, this means includes an adapter member 45 which includes an upraised annular lip 46 and a tapered free end 48 generally complementary to the beveled face 30 on the band 22. Additionally adapter band 45 has a beveled face 50 which mates with face 40 on ring 36 and is substantially identical to beveled face 30, and a rib 52 on the undersurface similar to rib 32 on band 22. Adapter member 45 may be kept separate and welded to band 22 in the field when necessary to form an adapter assembly, or so joined in the shop so that an adapter unit composed of band 22 and adapter 45 may be kept in stock in the field for use when changes in tire sizes are required. In addition, a stiffener band 53 may be welded to lip portions 26 and 46 of bands 22 and 45, respectively, to reinforce the assembly. The combined adapter unit is then installed with the beveled face 50 abutting beveled face 40 of lock ring 36 and the O-ring 44 in its usual position in its O-ring groove 42 adjacent raised portion 52 on band portion 45. The length of the leg portion of band 45 between lips 26 and 46 should be generally coextensive in dimension with the difference between the width across the bead of the enlarged and reduced tires which it is desired to mount on rim base 12.

As shown in FIGURE 4, another means of adapting the rim base for use with different width tires is to form a second lock ring groove 54 spaced laterally inwardly from the groove 34 as well as a second O-ring groove 56, the distance between both grooves being the same as the necessary reduced dimension across the bead width of the smaller tire which would be intended for use with the rim. In this case, the same bead seat band 22 could be used with the rim for both sizes of tires which would be mounted thereon.

By means of this invention, a pneumatic tire vehicle may be easily adapted for use in different environments. When it is desirable to change from a wide tire to a narrower tire, only the tires themselves need be replaced. Replacement of rims and the accompanying necessity for disassembling portions of the axle is eliminated, thereby making the changeover quickly and easily accomplished with little or no possibility of damage to internal components of the axle.

The foregoing detailed description has been given for clearness of understanding only, and no unnecessary limitations should be understood therefrom, as some modifications may be obvious to those skilled in the art.

I claim:

1. An adapter for use with a rim, a lock ring and a bead seat flange, said rim having a single lock ring groove capable of accepting the lock ring and an O-ring groove capable of accepting an O-ring, all of which are dimensioned for accepting a tire of a given width; said adapter permitting the mounting of a tire of a narrower width than said given width on the rim and comprising: an annular member having a beveled surface for engagement with said lock rim; an upstanding lip on said annular member spaced from said beveled surface a distance substantially equal to the difference in the width of said tires, said lip being engageable with the bead seat flange; a bead seat band, including a tapered portion for supporting the bead of said narrower tire, formed on the end of said member opposite to the beveled surface; and an annular rib formed on said member and extending toward the rim, said rib being positioned to sealingly engage the O-ring.

References Cited

UNITED STATES PATENTS

| | | | |
|---|---|---|---|
| 770,611 | 9/1904 | Scott | 152—396 |
| 915,304 | 3/1909 | Midgley | 152—396 |
| 977,586 | 12/1910 | Bosworth | 152—410 |
| 1,201,118 | 10/1916 | Wagenhorst | 152—408 |
| 1,235,360 | 7/1917 | Michael | 152—396 |

FOREIGN PATENTS

| | | |
|---|---|---|
| 1,067 | 1/1896 | Great Britain. |
| 132,492 | 2/1960 | U.S.S.R. |

ARTHUR L. LA POINT, Primary Examiner

CHARLES B. LYON, Assistant Examiner

U.S. Cl. X.R.

301—10